US008073759B1

(12) United States Patent
Del Favero et al.

(10) Patent No.: US 8,073,759 B1
(45) Date of Patent: Dec. 6, 2011

(54) METHOD AND SYSTEM FOR PREDICTIVE EVENT BUDGETING BASED ON FINANCIAL DATA FROM SIMILARLY SITUATED CONSUMERS

(75) Inventors: James Robert Del Favero, Mountain View, CA (US); Chris Lee, San Francisco, CA (US); Barron R. Ernst, San Francisco, CA (US); Marko Rukonic, San Jose, CA (US)

(73) Assignee: Intuit Inc., Mountain View, CA (US)

( * ) Notice: Subject to any disclaimer, the term of this patent is extended or adjusted under 35 U.S.C. 154(b) by 643 days.

(21) Appl. No.: 12/058,014

(22) Filed: Mar. 28, 2008

(51) Int. Cl.
G06Q 40/00 (2006.01)
(52) U.S. Cl. .................. 705/36 R; 705/1; 705/7; 705/8; 705/10; 705/28; 705/30; 705/35; 705/36; 705/37; 705/38; 700/286; 701/29; 235/375; 713/300; 715/501.1
(58) Field of Classification Search .................. 705/1, 7, 705/8, 10, 28, 30, 35, 36, 37, 38; 700/286; 701/29; 235/375; 713/300; 715/501.1
See application file for complete search history.

(56) References Cited

U.S. PATENT DOCUMENTS

| 5,559,313 | A | 9/1996 | Claus et al. | |
|---|---|---|---|---|
| 5,754,938 | A | 5/1998 | Herz et al. | |
| 6,363,488 | B1 | 3/2002 | Ginter et al. | |
| 7,403,906 | B2 | 7/2008 | Coleman | |
| 7,437,330 | B1 | 10/2008 | Robinson et al. | |
| 7,558,777 | B1 | 7/2009 | Santos | |
| 2001/0027408 | A1* | 10/2001 | Nakisa | 705/10 |
| 2002/0107809 | A1* | 8/2002 | Biddle et al. | 705/59 |
| 2002/0111725 | A1* | 8/2002 | Burge | 701/29 |
| 2002/0173986 | A1* | 11/2002 | Lehew et al. | 705/1 |
| 2002/0198801 | A1* | 12/2002 | Dixon et al. | 705/35 |
| 2003/0009402 | A1* | 1/2003 | Mullen et al. | 705/35 |
| 2003/0120570 | A1* | 6/2003 | Dellinger et al. | 705/35 |
| 2003/0139985 | A1* | 7/2003 | Hollar et al. | 705/30 |
| 2003/0144938 | A1* | 7/2003 | Lahre et al. | 705/36 |
| 2003/0177076 | A1* | 9/2003 | Might et al. | 705/28 |
| 2003/0222134 | A1* | 12/2003 | Boyd | 235/375 |
| 2004/0024638 | A1 | 2/2004 | Restis | |
| 2004/0158360 | A1* | 8/2004 | Garland et al. | 700/286 |

(Continued)

OTHER PUBLICATIONS

Getting Started with Quicken® 2007, copyright 2006, Chapters 1 and 2.

(Continued)

*Primary Examiner* — Mary Cheung
*Assistant Examiner* — Sanjeev Malhotra
(74) *Attorney, Agent, or Firm* — Gunnison, McKay & Hodgson, L.L.P.; Philip McKay

(57) ABSTRACT

Financial data associated with one or more "contributing consumers" is obtained from one or more sources. The financial data obtained from the one or more contributing consumers is then aggregated, analyzed, and/or categorized, according to one or more events causing the changes and one or more criteria/parameters associated with the financial transaction data and/or the contributing consumer. The aggregated and/or categorized data representing the event related changes in the financial data is then stored. A "user consumer" then initiates a request for predictive event cost data associated with one or more specified events and the aggregated and/or categorized data representing the event related changes in the financial data is searched based. Results data representing the changes in the financial data for one or more similarly situated contributing consumers associated the specified event is then obtained and presented to the user consumer.

12 Claims, 2 Drawing Sheets

U.S. PATENT DOCUMENTS

| | | |
|---|---|---|
| 2005/0015272 A1 | 1/2005 | Wind et al. |
| 2005/0071262 A1* | 3/2005 | Kobeh et al. .................... 705/35 |
| 2005/0080701 A1* | 4/2005 | Tunney et al. ................... 705/35 |
| 2005/0138440 A1* | 6/2005 | Barr et al. ...................... 713/300 |
| 2006/0101323 A1* | 5/2006 | Satyavolu ................... 715/501.1 |
| 2006/0212338 A1* | 9/2006 | Bogle et al. ..................... 705/10 |
| 2006/0242050 A1* | 10/2006 | Haggerty et al. ............... 705/35 |
| 2007/0011071 A1* | 1/2007 | Cuscovitch et al. ............ 705/35 |
| 2007/0055597 A1 | 3/2007 | Patel et al. |
| 2007/0088641 A1* | 4/2007 | Aaron et al. ..................... 705/35 |
| 2007/0118394 A1 | 5/2007 | Cahoon |
| 2007/0136177 A1* | 6/2007 | Reeth et al. ...................... 705/37 |
| 2007/0192165 A1* | 8/2007 | Haggerty et al. ............... 705/10 |
| 2007/0265902 A1* | 11/2007 | Brennen et al. ................... 705/8 |
| 2008/0065437 A1* | 3/2008 | Dybvig .............................. 705/7 |
| 2008/0195451 A1* | 8/2008 | Abram .............................. 705/8 |
| 2010/0268640 A1* | 10/2010 | Kuyper et al. ................... 705/38 |

OTHER PUBLICATIONS

Getting Started with Quicken® Home & Business, copyright 2006, Chapter 2.

Rukonic et al., "Method and System for Automatic Categorization of Financial Transaction Data Based on Financial Data From Similarly Situated Users", U.S. Appl. No. 12/059,372, filed Mar. 21, 2008.

Friel et al., "Method and System for Automatic Categorization of Financial Transactions as Business Financial Transactions or Personal Financial Transactions", U.S. Appl. No. 12/108,772, filed Apr. 24, 2008.

Klieman et al., "Method and System for Modifying Financial Transaction Categorization Lists Based on Input From Multiple Users", U.S. Appl. No. 12/265,021, filed Nov. 5, 2008.

* cited by examiner

METHOD AND SYSTEM FOR PREDICTIVE EVENT BUDGETING BASED ON FINANCIAL DATA FROM SIMILARLY SITUATED CONSUMERS

BACKGROUND

It is often very important for consumers to determine, as far in advance as possible, what bills they are likely to be responsible for, and any fluctuations that may occur in their finances. This is obviously true for budgeting purposes, but it is also true when contemplating life and/or purchase events, such as a change in marital status, having a child, change of residence, or when considering whether a given product and/or service should be purchased and/or what features of a given product and/or service are most important.

A consumer whose personal and financial situation has been relatively static generally knows what bills to expect, and what fluctuations are likely to occur in their finances, if any. Consequently, these static consumers are less likely to be caught off guard by hidden costs and/or changes in their finances. However, the reality for many consumers is that they will experience numerous life and/or financial events, some of which are beyond the control of the consumer. Consequently, for many consumers, when they do experience, expect, and/or contemplate, personal and/or financial events, determining what bills/costs are likely to be associated with the event, and/or what the financial impact of the event is likely to be, is an important, if not central, concern. However, making such a determination can be a relatively difficult task, and may not be recognized as an issue until the event takes place, despite the fact that, in most cases, it is better to prepare for the financial consequences of an event as far ahead of the event as possible.

For instance, a given consumer may have recently been informed that they will be having a baby. In this case, particularly if the baby is a first child, the consumer may be very interested in determining the expected costs and/or other financial impact of parenthood. The consumer can probably relatively accurately determine some of the costs associated with the baby, such as, for instance, the hospital costs under the consumer's healthcare plan and perhaps the financial impact of maternity leave. The consumer can probably also fairly accurately determine the cost of food and perhaps clothing for the baby. However, in many cases, there are hidden costs/bills and/or other financial changes associated with a life event like having a child that the consumer may not be able to identify so readily, such as, but not limited to: tax consequences of parenthood; costs of local preschools; cost of life insurance for the parents; daycare costs; diaper costs; expenses associated with keeping a residence warmer for the baby; various protective devices and household upgrades associated with a baby; baby related accessory costs, such as car seats, toys, cribs, play pens, etc. As noted, often these costs are overlooked by parents-to-be, especially first-time parents. Some of the costs/changes in financial situation associated with having a baby may be general in nature while others are area and/or demographically variable.

As another example, a consumer buying, or contemplating buying, a house for the first time may be unaware of numerous bills/costs associated with home ownership either in general, or associated with a given area such as, but not limited to: trash service; property taxes; sewer service; gardener service; and various utilities and maintenance costs and/or how these cost fluctuate according to season and/or from month-to-month.

As another example, a consumer buying, or contemplating buying, a new car may be unaware of numerous bills/costs associated with ownership of the new car, such as: differences in gasoline consumption/cost between the new car and any existing vehicle; differences in maintenance costs between the new car and an existing vehicle; differences in insurance costs between the new car and an existing vehicle; etc. Some of the costs/changes in financial situation associated with buying a new car may also be general in nature while others are area and/or demographically variable.

As a result of the situation described above, currently it can be quite difficult for many consumers to determine the actual total costs and/or financial impact associated with a given life and/or financial event, both in terms of identifying all likely bills, and in terms of anticipating fluctuations in recurring/anticipated bills. Consequently, many consumers are faced with unexpected costs/bills, and many carefully prepared budgets are negated by these unexpected costs/bills. This can cause significant consumer stress and have a direct effect on the consumer's ability to deal with the event, both financially and emotionally.

SUMMARY

In accordance with one embodiment, a system and method for predictive event budgeting includes a process for predictive event budgeting whereby financial data associated with one or more "contributing consumers" is obtained from one or more sources. In one embodiment, the financial data includes data associated with specific financial transactions. In one embodiment, the financial data is categorized and, in one embodiment, multiple financial transactions are associated with a specific expense category. In one embodiment, the financial data obtained from the one or more contributing consumers is then monitored for variations/changes in the financial data. In one embodiment, changes in the financial data are then identified and associated with one or more specific events that led to the changes in the financial data. In one embodiment, the data representing the event related changes in the financial data are then analyzed and aggregated and/or categorized according to the one or more events that caused the event related changes in the financial data and/or one or more criteria/parameters associated with the data and/or the contributing consumer. In one embodiment, the aggregated and/or categorized data representing the event related changes in the financial data is then stored by the process for predictive event budgeting. In one embodiment, a "user consumer" then initiates a request for predictive event cost data associated with one or more events. In one embodiment, the aggregated and/or categorized data representing the event related changes in the financial data for the one or more contributing consumers is then searched based on one or more search parameters provided by and/or associated with the user consumer. Results data representing the changes in the financial data for one or more similarly situated contributing consumers associated with the specified event is obtained. In one embodiment, the results data obtained is then presented to the user consumer in any one of various data and/or report formats, and, in one embodiment, the user consumer is notified/alerted to predicted fluctuations in his or her bills and/or financial situation well in advance of the expected event in order to provide the user consumer the opportunity to budget for the event.

In one embodiment, the financial data obtained from one or more contributing consumers is general financial data representing a given contributing consumer's general and/or overall financial status and/or demographics, including, but not limited to: the contributing consumer's area of residence/zip code; the contributing consumer's total assets; details regarding one or more of the contributing consumer's assets, such as the size and location of the contributing consumer's house; the contributing consumer's total liabilities/debt; the contributing consumer's net worth; the contributing consumer's average discretionary spending; details regarding the contributing consumer's spending habits and monthly/recurring expenses; the contributing consumer's age group; various demographic data regarding the contributing consumer and/or the contributing consumer's spending; the contributing consumer's marital status and/or number of dependents; the contributing consumer's commute; and/or any other data regarding the contributing consumer's general and/or overall financial status desired and/or available. In one embodiment, as discussed below, the contributing consumer's general and/or overall financial status and/or demographics data is used to categorize and/or identify contributing consumers, and their financial data, according to various criteria so that contributing consumer's most like a given user consumer can be identified and/or a user consumer can narrow search results to results from specific "types" of contributing consumers.

In one embodiment, the financial data for one or more contributing consumers includes data regarding specific financial transactions conducted by the contributing consumer including, but not limited to: dates of specific financial transactions; payees/payers associated with specific financial transactions; categories of specific financial transactions; total expenditures in specific financial transaction categories over designated time frames; specific items purchased through specific financial transactions; and/or any other data regarding specific financial transactions desired and/or available, and designated as sharable by the contributing consumer.

In one embodiment, the financial data for one or more contributing consumers is obtained from one or more computing system implemented financial management systems as defined herein, and/or as known in the art the time of filing, and/or as developed after the time of filing.

In one embodiment, the contributing consumers agree to share the financial data with user consumers on a transaction-by-transaction approval basis. In one embodiment, the contributing consumers agree to share the financial data with user consumers on a transaction category approval basis. In one embodiment, the contributing consumers agree to share the financial data with user consumers without restriction. In other embodiments, the contributing consumers agree to share the financial data with user consumers based on any restrictions/criteria defined by the contributing consumer.

In one embodiment, the financial data to be shared is tagged as sharable by the contributing consumers using a user interface display and a user interface device, such as those defined herein, known in the art, or developed after the time of filing.

In one embodiment, specific financial transaction data is categorized by the contributing consumer and one or more specific financial transactions are associated by the contributing consumer with a specific category, such as utilities, or clothing, or car/gas. In one embodiment, specific financial transaction data is categorized by a computing system implemented financial management system, as defined herein, known at the time of filing, or as developed thereafter. In one embodiment, specific financial transaction data is categorized by the process for predictive event budgeting and/or the provider of the process for predictive event budgeting.

In one embodiment, the financial data obtained from the one or more contributing consumers is monitored for variations/changes in the financial data by the process for predictive event budgeting and/or the provider of the process for predictive event budgeting. In one embodiment, the financial data obtained from the one or more contributing consumers is monitored for variations/changes in the financial data by determining expenditures in one of more expense categories periodically and then comparing the expenditures in one of more expense categories with previous periods. In one embodiment, the financial data obtained from the one or more contributing consumers is monitored for variations/changes in the financial data by determining amounts associated with one of more recurring transactions periodically and then comparing the amounts associated the one of more recurring transactions with previous transactions. In one embodiment, the financial data obtained from the one or more contributing consumers is monitored for variations/changes in the financial data by setting threshold amounts of change in the financial data for a given expense category and/or transaction and then investigating any changes exceeding the threshold amount of change.

In one embodiment, once a change in the financial data is identified, the change in the financial data is associated with one or more life and/or financial events such as, but not limited to: a change in marital status; having a child; a change of residence; a purchase/use of a given product and/or service; or any other event that may have an effect on a contributing consumer's financial data. In one embodiment, once a change in the financial data is identified, the change in the financial data is associated with one or more life and/or financial events by the process for predictive event budgeting and/or the provider of the process for predictive event budgeting by analyzing the financial data associated with the contributing consumers and identifying change identifying transactions such as pregnancy/hospital transactions, changes of address, changes of payees, etc.

In one embodiment, once a change in the financial data of a contributing consumer is identified, the change in the financial data is associated with one or more life and/or financial events by contacting the contributing consumer whose data includes the change and requesting the contributing consumer to identify one or more events associated with the change in the financial data. In one embodiment, the contributing consumer is contacted by the process for predictive event budgeting and/or the provider of the process for predictive event budgeting.

In one embodiment, changes in financial data and/or specific transactions of a contributing consumer are tagged and/or identified as being associated with one or more events by the contributing consumer using a user interface display and a user interface device, such as those defined herein, known in the art, or developed after the time of filing. In one embodiment, specific financial transaction data is categorized as being associated with one or more specific events by the contributing consumer.

In one embodiment, the data representing the event related changes in the financial data from one or more contributing consumers is then aggregated, analyzed, and/or categorized according to the one or more events that caused the event related changes in the financial data and/or one or more parameters associated with the contributing consumer such as, but not limited to: the contributing consumer's area of residence/zip code; the contributing consumer's total assets; details regarding one or more of the contributing consumer's assets, such as the size and location of the contributing consumer's house and/or the type of car the contributing consumer drives; the contributing consumer's total income and/or the percentage of the contributing consumer's income spent in a given category of the financial transaction data; the contributing consumer's net worth; the contributing consumer's average discretionary spending and/or the percentage of the contributing consumer's discretionary spending spent in the category of the financial transaction data; the contributing consumer's age group; various demographic data regarding the contributing consumer and/or the contributing consumer's spending; the contributing consumer's marital status and/or number of dependents; the contributing consumer's commute and/or profession; and/or any other data regarding the contributing consumer's general and/or overall financial status desired and/or available.

In one embodiment the aggregated and/or categorized data representing the event related changes in the financial data is then stored by, or under the control of, the process for predictive event budgeting in a database, as defined herein, known in the art at the time of filing, or as developed after the time of filing.

In one embodiment, a user consumer then initiates a request for predictive event cost data associated with one or more specified events using a user interface display and a user interface device. In one embodiment, the user consumer provides other search parameters and/or criteria, such as a request to see all results from specific categories of contributing consumers or from contributing consumers having specific financial and/or demographic attributes.

In one embodiment, the aggregated and/or categorized data representing the event related changes in the financial data from one or more contributing consumers is then searched and search results data associated with the one or more specified events, and/or most closely matching any user consumer search parameters and/or criteria, is gathered. In one embodiment, the search results data includes data representing all financial transactions, and therefore all bills and/or bill payments, associated with the one or more specified events of the user consumer initiated search request.

In one embodiment, the search results data associated with the one or more specified events, and/or most closely matching any user consumer search parameters and/or criteria, is then presented to the user consumer in any one of various data and/or report formats.

In one embodiment, the user consumer is shown a listing of specific bills paid by the one or more contributor consumers associated with the one or more specified events of the user consumer initiated search request. In one embodiment, the user consumer is shown a listing of costs in specific categories paid by the one or more contributor consumers associated with the one or more specified events of the user consumer initiated search request. In this way, a user consumer can potentially see all bills and/or changes in financial data associated with the one or more specified events, including bills associated with potentially hidden costs the user consumer was not aware of.

In one embodiment, the user consumer is shown results and/or alerted to potential upcoming bills and/or bill fluctuations associated with the one or more specified events manually in response to a specific user consumer request. In one embodiment, the user consumer is shown results and/or alerted to potential upcoming bills and/or bill fluctuations associated with the one or more specified events, semi-automatically or automatically on a periodic basis. In one embodiment, the user consumer is shown results and/or alerted to potential upcoming bills and/or bill fluctuations associated with the one or more specified events automatically on a periodic basis well in advance of the predicted bills and/or bill fluctuations in order to provide the user consumer the opportunity to budget for the predicted fluctuations.

Using the system and method for predictive event budgeting disclosed herein, a user consumer is provided the opportunity to see financial data associated with other similarly situated consumer's and, in particular, see what costs and/or changes in the financial data are associated with a specified life and/or financial event. Consequently, using the system and method for predictive event budgeting disclosed herein, a consumer can learn from the experience of similarly situated consumers and thereby more readily determine the actual costs that are associated with a given event. Therefore, using the system and method for predictive event budgeting disclosed herein, the consumer can accurately budget for an event well in advance and is far less likely to be faced with unexpected costs associated with a life and/or financial event.

Figure 1:
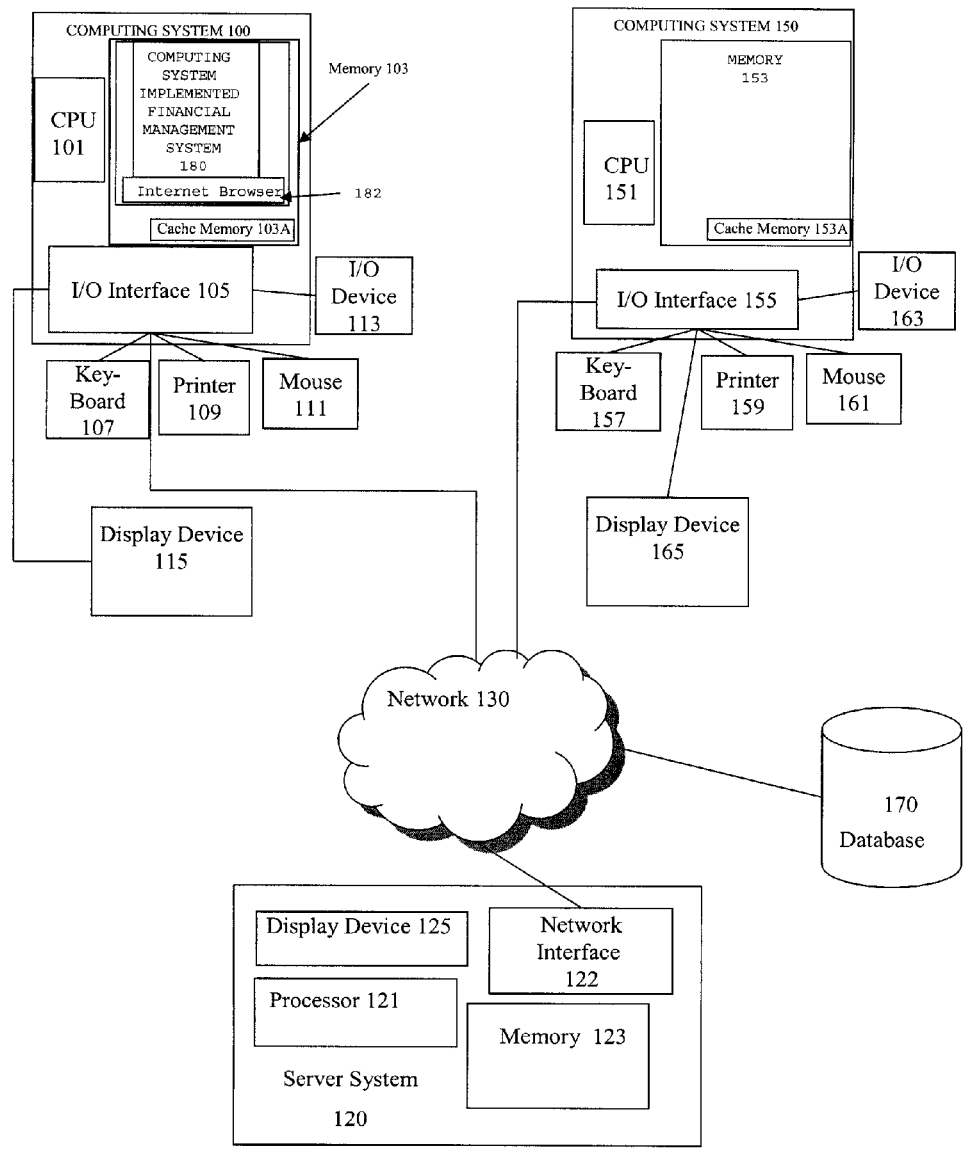
FIG. 1 is a block diagram of an exemplary hardware architecture for implementing one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be embodied in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

In accordance with one embodiment, a system and method for predictive event budgeting includes a process for predictive event budgeting whereby financial data associated with one or more "contributing consumers" is obtained from one or more sources. In one embodiment, the financial data includes data associated with specific financial transactions. In one embodiment, the financial data is categorized and, in one embodiment, multiple financial transactions are associated with a specific expense category. In one embodiment, the financial data obtained from the one or more contributing consumers is then monitored for variations/changes in the financial data. In one embodiment, changes in the financial data are then identified and associated with one or more specific events that led to the changes in the financial data. In one embodiment, the data representing the event related changes in the financial data are then analyzed and aggregated and/or categorized according to the one or more events that caused the event related changes in the financial data and/or one or more criteria/parameters associated with the data and/or the contributing consumer. In one embodiment, the aggregated and/or categorized data representing the event related changes in the financial data is then stored by the process for predictive event budgeting. In one embodiment, a "user consumer" then initiates a request for predictive event cost data associated with one or more events. In one embodiment, the aggregated and/or categorized data representing the event related changes in the financial data for the one or more contributing consumers is then searched based on one or more search parameters provided by and/or associated with the user consumer. Results data representing the changes in the financial data for one or more similarly situated contributing consumers associated with the specified event is obtained. In one embodiment, the results data obtained is then presented to the user consumer in any one of various data and/or report formats, and, in one embodiment, the user consumer is notified/alerted to predicted fluctuations in his or her bills and/or financial situation well in advance of the expected event in order to provide the user consumer the opportunity to budget for the event.

Hardware System Architecture

FIG. 1 is a block diagram of an exemplary hardware architecture for implementing one embodiment of a system and method for predictive event budgeting, such as exemplary process 200 (FIG. 2) discussed herein, that, returning to FIG. 1, includes: a computing system 100, e.g., a first computing system; a computing system 150, e.g., a second computing system; a server system 120; and a database 170, all operatively coupled by a network 130.

As seen in FIG. 1, computing system 100 typically includes a central processing unit (CPU) 101, an input/output (I/O) interface 105, and a memory system 103, including cache memory 103A. In one embodiment, memory system 103 includes all, or part of, a computing system implemented financial management system 180 such as any computing system implemented financial management system defined herein, known in the art at the time of filing, and/or as developed thereafter. In one embodiment, computing system implemented financial management system 180 is stored, in whole, or in part, in memory system 103, and is used by, or includes, or is accessed by, a process for predictive event budgeting, such as exemplary process 200 (FIG. 2) discussed below.

Returning to FIG. 1, computing system 100 may further include standard user interface devices such as a keyboard 107, a mouse 111, a printer 109, and a display device 115, as well as, one or more standard input/output (I/O) devices 113, such as a compact disk (CD) or Digital Video Disc (DVD) drive, floppy disk drive, or other digital or waveform port, or other device capable of inputting data to, and outputting data from, computing system 100, whether available or known at the time of filing or as later developed. As discussed in more detail below, in one embodiment, a process for predictive event budgeting and/or a computing system implemented financial management system are entered, in whole, or in part, into computing system 100 via I/O device 113, such as from a CD, DVD, floppy disk, portable hard drive, memory stick, download site, or other medium and/or computer program product as defined herein.

In one embodiment, computing system 100 also includes an Internet browser capability 182 that, in one embodiment, includes a search engine (not shown) and is stored, in whole, or in part in memory 103.

In one embodiment, computing system 100 is a computing system accessible by one or more contributing consumers and/or user consumers and used, and/or accessible, by another computing system, such as computing system 150 (discussed below). Computing systems 100 and 150 can be any computing system as defined herein and/or as known in the art at the time of filing and/or as developed thereafter, that includes components that can execute all, or part, of a process for predictive event budgeting, and/or a computing system implemented financial management system, in accordance with at least one of the embodiments as described herein.

In one embodiment, computing system 100 is used, controlled, and/or accessible by, a provider of and/or a system and process for predictive event budgeting and data representing all, or part, of financial data associated with one or more contributing consumers is stored in computing system 100, typically in accounts associated with a given contributing consumer. In one embodiment, computing system 100 is used, controlled, and/or accessible by, a provider of and/or a computing system implemented financial management system and data representing all, or part, of financial data associated with one or more contributing consumers is stored in computing system 100, typically in accounts associated with a given contributing consumer.

Similarly, computing system 150 typically includes a CPU 151, an input/output (I/O) interface 155, and a memory system 153, including cache memory 153A. Similar to computing system 100, computing system 150 may further include standard user interface devices such as a keyboard 157, a mouse 161, a printer 159, and a display device 165, as well as, one or more standard input/output (I/O) devices 163, such as a compact disk (CD) or DVD drive, floppy disk drive, or other digital or waveform port, or other device capable of inputting data to, and outputting data from, computing system 150, whether available or known at the time of filing or as later developed.

In one embodiment, computing system 150 is used, controlled, and/or accessible by one or more user consumers and used, and/or accessible, by another computing system, such as computing system 100. In one embodiment, computing system 150 is used, controlled, and/or accessible by, a provider of and/or a system and process for predictive event budgeting and data representing all, or part, of data associated with one or more user and/or contributing consumers is stored in computing system 150, typically in accounts associated with a given consumer. In one embodiment, computing system 150 is used, controlled, and/or accessible by, a provider of and/or a computing system implemented financial management system and data representing all, or part, of financial data associated with one or more user and/or contributing consumers is stored in computing system 150, typically in accounts associated with a given consumer.

As discussed in more detail below, in one embodiment, all, or part of, a process for predictive event budgeting, and/or a computing system implemented financial management system, can also be loaded, in whole, or in part, into computing system 150 from computing system 100 for storage in memory system 153 and/or cache memory 153A.

Also shown in FIG. 1 is database 170. In one embodiment, database 170 is a data storage device, a designated server system or computing system, or a designated portion of one or more server systems or computing systems, such as computing systems 100, 150 and server system 120, or a distributed database, or an external and/or portable hard drive. In one embodiment, database 170 is a dedicated mass storage device implemented in software, hardware, or a combination of hardware and software. In one embodiment, database 170 includes a web-based function. As discussed in more detail below, in one embodiment, database 170 is under the control of a contributing consumer, and/or the contributing consumer's agents, a user consumer, and/or the user consumer's agents, and/or a process for predictive event budgeting, and/or a computing system implemented financial management system.

In one embodiment, database 170 is used, controlled, and/or accessible by, a provider of and/or a system and process for predictive event budgeting and data representing all, or part, of financial data associated with one or more contributing consumers is stored in database 170 (FIG. 1). In one embodiment, database 170 is used, controlled, and/or accessible by, a provider of and/or a computing system implemented financial management system and data representing all, or part, of financial data associated with one or more contributing consumers is stored in database 170.

In one embodiment, computing systems 100 and 150, and database 170, are coupled to a server system 120 through network 130. In one embodiment, server system 120 includes a server system display device 125, a server system processor 121, a server system memory 123, and a server system network interface 122.

In one embodiment, server system 120 is used in a station-to-station arrangement, such as a peer-to-peer, or hybrid peer-to peer, arrangement, as an indexing and/or central server used to connect a first computing system, such as computing system 100, and a second computing system, such as computing system 150.

In one embodiment, server system 120 is used, controlled, and/or accessible by, a provider of and/or a system and process for predictive event budgeting and data representing all, or part, of financial data associated with one or more contributing consumers is stored in server system 120. In one embodiment, server system 120 is used, controlled, and/or accessible by, a provider of and/or a computing system implemented financial management system and data representing all, or part, of financial data associated with one or more contributing consumers is stored in server system 120.

Network 130 can be any network or network system as defined herein, known in the art at the time of filing, and/or as developed after the time of filing, capable of allowing communication between two or more computing systems.

Those of skill in the art will readily recognize that the components shown in FIG. 1, such as computing systems 100 and 150, database 170, server system 120, and their respective components, are shown for illustrative purposes only and that architectures with more or fewer components can implement, and benefit from, the invention. Moreover, one or more components of computing system 100, computing system 150, database 170, and server system 120 may be located remotely from their respective system and accessed via network 130. In addition, the particular type of, and configuration of, computing systems 100 and 150, database 170, and server system 120 are not relevant.

As discussed in more detail below, in one embodiment, a process for predictive event budgeting, and/or a computing system implemented financial management system, and/or financial data associated with one or more contributing consumers, are stored, in whole, or in part, in memory system 103 and/or cache memory 103A, of computing system 100, and/or memory system 153 and/or cache memory 153A of computing system 150, and/or in server memory system 123 of server system 120 and/or in database 170, and executed on computing system 100 and/or computing system 150. As used herein, a memory refers to a volatile memory, a non-volatile memory, or any combination of the two.

Although a process for predictive event budgeting, and/or a computing system implemented financial management system, are sometimes referred to herein, alternatively, as a process, an application, a module, a program, a component of a software system, a component of a software package, a component of a parent system, a plug-in, or a feature of a parent system, this terminology is illustrative only. In some embodiments, a process for predictive event budgeting and/or a computing system implemented financial management system are capable of being called from an application or the operating system. In one embodiment, an application, process, or program is generally defined to be any executable code. Moreover, those of skill in the art will understand that when it is said that an application, process, or an operation takes some action, the action is the result of executing one or more instructions by a processor, such as CPUs 101 and 151, or server system processor 121. In one embodiment, execution of a process by CPU 101, CPU 151, or server system processor 121, results in the operations of an agent computer process (not shown) and/or a rule computer process (not shown).

In one embodiment, a process for predictive event budgeting, and/or a computing system implemented financial management system, and/or financial data associated with one or more contributing consumers, are computer applications or processes and/or data implemented and/or run and/or stored, in full, or in part, in, or on, a computer program product. Herein, a computer program product comprises a medium and/or I/O device configured to store or transport computer readable code, whether available or known at the time of filing or as later developed. Some examples of computer program products are CDs, DVDs, ROM cards, floppy discs, magnetic tapes, computer hard drives, portable hard drives, flash memory, volatile and non-volatile memory sticks, servers on a network, such as server system 120 of FIG. 1, and signals transmitted over a network, such as network 130 of FIG. 1, or other media or process capable of delivering computer readable data representing computer readable code, whether available or known at the time of filing or as later developed. This medium may belong to a computing system, such as computing systems 100 and 150 of FIG. 1, described above. However, in some embodiments, the medium also may be removable and/or remote from the computing system.

Process

Herein, the term "contributing consumer", denotes any party and/or entity for whom, or from whom, financial data is obtained by a process for predictive event budgeting, and/or a person and/or entity for whom, or from whom, financial data is obtained by a process for predictive event budgeting, and/or a legal guardian of person and/or entity for whom, or from whom, financial data is obtained by a process for predictive event budgeting, and/or an authorized agent of any party and/or person and/or entity for whom, or from whom, financial data is obtained by a process for predictive event budgeting.

Herein, the term "user consumer" and "user" are used interchangeably to denote any party and/or entity that interfaces with, and/or to whom information is provided by, a process for predictive event budgeting, and/or a person and/or entity that interfaces with, and/or to whom information is provided by, a process for predictive event budgeting, and/or a legal guardian of person and/or entity that interfaces with, and/or to whom information is provided by, a process for predictive event budgeting, and/or an authorized agent of any party and/or person and/or entity that interfaces with, and/or to whom information is provided by, a process for predictive event budgeting.

As used herein, the term "product" and "product and/or service" are used interchangeably to denote a product, a service, or both a product and a service, or multiple products and/or services that can be purchased and/or otherwise obtained by a contributing consumer and/or a user consumer.

As used herein, the terms "event", "life event", "financial event" and "life and/or financial event" are use interchangeable to denote any action, inaction, occurrence, non-occurrence, purchase, or change of any kind that has an impact on a consumer's financial position and/or data. Some examples of events as used herein includes, but is not limited to: a change in marital status; having a child; a change of residence; a purchase/use of a given product and/or service; or any other occurrence that may have an effect on a contributing consumer's financial data.

As used herein, the terms "bill", "cost", "cost/bill" and "recurring cost" are used interchangeably to denote a recurring cost to a consumer. Herein a recurring cost is any cost that occurs on a periodic basis whether the period is daily, weekly, monthly, quarterly, semiannually, annually, bi-annually, or at an other more or less regular interval.

As used herein, the term computing system, denotes, but is not limited to: a portable computer; a workstation; a two-way pager; a cellular telephone; a smart phone; a digital wireless telephone; a Personal Digital Assistant (PDA); a media player, i.e., an MP3 Player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

As used herein, the term computing system implemented financial management system includes, but is not limited to: computing system implemented personal and small business financial management systems, packages, programs, modules, or applications; computing system implemented business systems, packages, programs, modules, or applications; computing system implemented tax preparation systems, packages, programs, modules, or applications; computing system implemented accounting and/or invoicing systems, packages, programs, modules, or applications; and various other electronic transaction driven data management systems, packages, programs, modules, or applications, whether known at the time of filling or as developed later.

As used herein, the term "network" is used to demote any network or network system that is of interest such as, a peer-to-peer network, a hybrid peer-to-peer network, a Local Area Network (LAN), a Wide Area Network (WAN), a public network, such as the Internet, a private network, a combination of different network types, or other wireless, wired, and/or a wireless and wired combination network capable of allowing communication between two or more computing systems, whether available or known at the time of filing or as later developed.

As used herein, the term "database" is used to define any data storage mechanism known at the time of filing or as developed thereafter, such as, but not limited to: a data storage device; a designated server system or computing system, or a designated portion of one or more server systems or computing systems; a mobile computing system; a server system network; a distributed database; or an external and/or portable hard drive. Herein, the term "database" can refer to a dedicated mass storage device implemented in software, hardware, or a combination of hardware and software. Herein, the term "database" can refer to a web-based function. Herein, the term "database" can refer to a data storage means that is part of, or under the control of, any computing system, as defined, known at the time of filing, or as developed thereafter.

In accordance with one embodiment, a system and method for predictive event budgeting includes a process for predictive event budgeting whereby financial data associated with one or more "contributing consumers" is obtained from one or more sources. In one embodiment, the financial data includes data associated with specific financial transactions. In one embodiment, the financial data is categorized and, in one embodiment, multiple financial transactions are associated with a specific expense category. In one embodiment, the financial data obtained from the one or more contributing consumers is then monitored for variations/changes in the financial data. In one embodiment, changes in the financial data are then identified and associated with one or more specific events that led to the changes in the financial data. In one embodiment, the data representing the event related changes in the financial data are then analyzed and aggregated and/or categorized according to the one or more events that caused the event related changes in the financial data and/or one or more criteria/parameters associated with the data and/or the contributing consumer. In one embodiment, the aggregated and/or categorized data representing the event related changes in the financial data is then stored by the process for predictive event budgeting. In one embodiment, a "user consumer" then initiates a request for predictive event cost data associated with one or more events. In one embodiment, the aggregated and/or categorized data representing the event related changes in the financial data for the one or more contributing consumers is then searched based on one or more search parameters provided by and/or associated with the user consumer. Results data representing the changes in the financial data for one or more similarly situated contributing consumers associated with the specified event is obtained. In one embodiment, the results data obtained is then presented to the user consumer in any one of various data and/or report formats, and, in one embodiment, the user consumer is notified/alerted to predicted fluctuations in his or her bills and/or financial situation well in advance of the expected event in order to provide the user consumer the opportunity to budget for the event.

Figure 2:
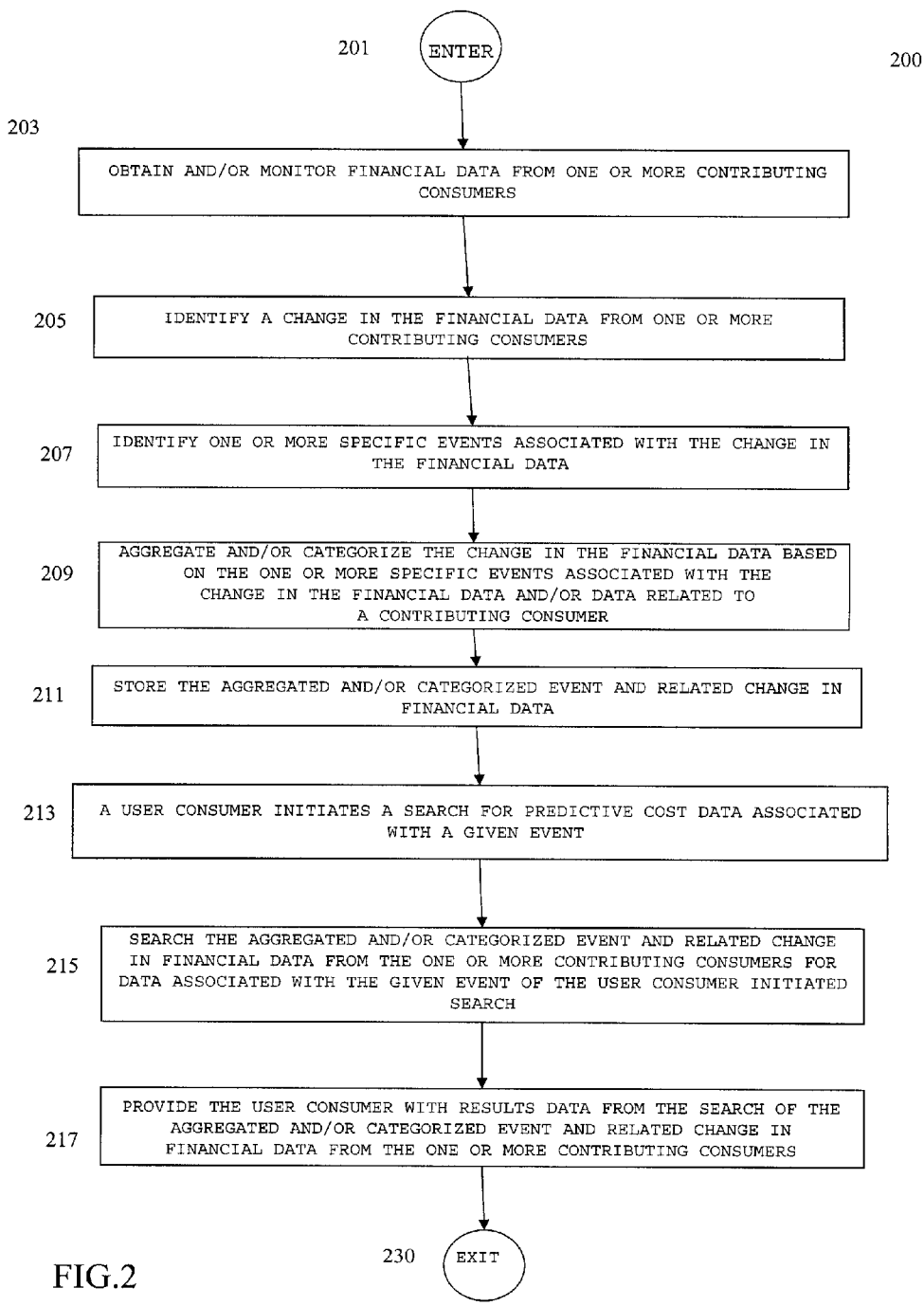
FIG. 2 is a flow chart depicting a process for predictive event budgeting in accordance with one embodiment.

FIG. 2 is a flow chart depicting a process for predictive event budgeting 200 in accordance with one embodiment. Process for predictive event budgeting 200 begins at ENTER OPERATION 201 of FIG. 2 and process flow proceeds to OBTAIN AND/OR MONITOR FINANCIAL DATA FROM ONE OR MORE CONTRIBUTING CONSUMERS OPERATION 203.

In one embodiment, at OBTAIN AND/OR MONITOR FINANCIAL DATA FROM ONE OR MORE CONTRIBUTING CONSUMERS OPERATION 203 financial data associated with one or more "contributing consumers" is obtained from one or more sources and/or monitored.

In one embodiment, at OBTAIN AND/OR MONITOR FINANCIAL DATA FROM ONE OR MORE CONTRIBUTING CONSUMERS OPERATION 203 the contributing consumers agree to share the financial data with other "user consumers" by any one of various means, including, tagging specific financial data as sharable data. In one embodiment, the financial data includes data associated with specific financial transactions and, in one embodiment, the specific financial transactions are tagged as sharable by the contributing consumers. In one embodiment, the specific financial transactions are categorized by the contributing consumers and/or associated with a specific type of expense.

In one embodiment, at OBTAIN AND/OR MONITOR FINANCIAL DATA FROM ONE OR MORE CONTRIBUTING CONSUMERS OPERATION 203, the financial data obtained from one or more contributing consumers includes general financial data obtained from the contributing consumer representing a given contributing consumer's general and/or overall financial status and/or demographics, including, but not limited to: the contributing consumer's area of residence/zip code; the contributing consumer's total assets;

details regarding one or more of the contributing consumer's assets, such as the size and location of the contributing consumer's house and/or the type of car the contributing consumer drives; the contributing consumer's total income and/or the percentage of the contributing consumer's income spent in a given category of financial data; the contributing consumer's net worth; the contributing consumer's average discretionary spending and/or the percentage of the contributing consumer's discretionary spending spent in a given category of financial data; the contributing consumer's age group; various demographic data regarding the contributing consumer and/or the contributing consumer's spending; the contributing consumer's marital status and/or number of dependents; the contributing consumer's commute; the contributing consumer's yearly mileage; the contributing consumer's profession; and/or any other data regarding the contributing consumer's general and/or overall financial status desired and/or available.

In one embodiment, as discussed below, the contributing consumer's general and/or overall financial status and/or demographics data is used to categorize and/or identify contributing consumers, and their shared financial data, according to various criteria/parameters so that, in one embodiment, process for predictive event budgeting 200 can find financial data from contributing consumers similarly situated with respect to a given user consumer. In one embodiment, as discussed below, the contributing consumer's general and/or overall financial status and/or demographics data is used to categorize and/or identify contributing consumers, and their shared financial data according to various criteria/parameters so that a user consumer can narrow search results to results from specific "types" of contributing consumers.

In one embodiment, at OBTAIN AND/OR MONITOR FINANCIAL DATA FROM ONE OR MORE CONTRIBUTING CONSUMERS OPERATION 203 the financial data associated with one or more contributing consumers represents various financial transactions conducted by a given contributing consumer. In one embodiment, at OBTAIN AND/OR MONITOR FINANCIAL DATA FROM ONE OR MORE CONTRIBUTING CONSUMERS OPERATION 203 the financial data representing various financial transactions conducted by the contributing consumer includes, but is not limited to, data representing: dates of specific financial transactions; payees/payers associated with specific financial transactions; categories of specific financial transactions, such as the expense category assigned to a given specific financial transaction; total expenditures in specific financial transaction categories over designated time frames; specific items purchased through specific financial transactions; the geographic location of specific financial transactions; the geographic location where one or more services and/or products associated with specific financial transactions are used/delivered; and/or any other data regarding specific financial transactions desired and/or available.

In one embodiment, at OBTAIN AND/OR MONITOR FINANCIAL DATA FROM ONE OR MORE CONTRIBUTING CONSUMERS OPERATION 203 at least part of the financial data associated with one or more contributing consumers is obtained by process for predictive event budgeting 200 using, and/or through, and/or from, a computing system implemented financial management system.

In one embodiment, the financial data associated with one or more contributing consumers obtained at OBTAIN AND/OR MONITOR FINANCIAL DATA FROM ONE OR MORE CONTRIBUTING CONSUMERS OPERATION 203 includes data associated with financial transactions conducted using multiple payment methods and/or accounts to provide as complete a set of contributing consumer financial data as possible. For instance, in one embodiment, the financial data associated with one or more contributing consumers is obtained at OBTAIN AND/OR MONITOR FINANCIAL DATA FROM ONE OR MORE CONTRIBUTING CONSUMERS OPERATION 203 from, but not limited to, any one or more of the following sources: banks; debit cards and/or accounts; credit unions; credit cards and/or accounts and/or credit card/account providers; asset accounts and/or asset account providers; a user controlled computing system implemented financial management system; or other financial resources, accounts and/or services used by a contributing consumer to pay for and/or conduct financial transactions.

In addition, in some embodiments, the financial data associated with one or more contributing consumers obtained at OBTAIN AND/OR MONITOR FINANCIAL DATA FROM ONE OR MORE CONTRIBUTING CONSUMERS OPERATION 203 is obtained from multiple sources of the same type. For instance, in one embodiment, the financial data associated with one or more contributing consumers is obtained at OBTAIN AND/OR MONITOR FINANCIAL DATA FROM ONE OR MORE CONTRIBUTING CONSUMERS OPERATION 203 from: two or more banks; two or more debit cards and/or accounts; two or more credit unions; two or more credit cards and/or accounts and/or credit card/account providers; two or more asset accounts and/or asset account providers; two or more user controlled computing system implemented financial management systems; and/or two or more other financial resources, accounts and/or services used by a contributing consumer to pay for and/or conduct financial transactions.

As noted above, in one embodiment, all, or part, of the financial data associated with one or more contributing consumers is obtained by process for predictive event budgeting 200 at OBTAIN AND/OR MONITOR FINANCIAL DATA FROM ONE OR MORE CONTRIBUTING CONSUMERS OPERATION 203 from, or using, a computing system implemented financial management system, such as computing system implemented financial management system 180 (FIG. 1), that implements, includes, is accessed by, and/or is otherwise associated with process for predictive event budgeting 200 (FIG. 2).

Currently, various computing system implemented financial management systems are available as defined herein. Computing system implemented financial management systems typically help users/contributing consumers manage their finances by providing a centralized interface with banks, credit card companies, and other various financial institutions and/or accounts, for identifying, processing, storing, and categorizing user/contributing consumer financial transactions and other contributing consumer financial data. Currently, computing system implemented financial management systems typically obtain financial transaction information, such as payee identification, payee location, payment amount, date of the transaction, time of transaction, items purchased, the type of transaction, etc., via communication with banks, credit card providers, or other financial institutions, using electronic data transfer systems such as the Open Financial Exchange (OFX) specification or various other systems for transferring financial transaction data.

As noted above, using computing system implemented financial management systems, the financial transaction information, user defined category of the financial transaction, payee identification, payee location, payment amount, date of the transaction, and other data is often used by the computing system implemented financial management system to categorize individual financial transactions as a particular type of income or expense. Some currently offered computing system implemented financial management systems then use this financial transaction information to track events, such as purchase events, and to provide various historical data reports or displays including "to date" data reports such as historical spending data reports in one or more particular categories, associated with one or more particular products and/or services, and/or with one or more particular payees, and/or one or more specific events.

In one embodiment, the financial data associated with one or more contributing consumers obtained using one or more computing system implemented financial management systems is transferred, or otherwise made available to, process for predictive event budgeting 200 at OBTAIN AND/OR MONITOR FINANCIAL DATA FROM ONE OR MORE CONTRIBUTING CONSUMERS OPERATION 203.

In one embodiment, all, or part, of the financial data associated with one or more contributing consumers is obtained by process for predictive event budgeting 200 at OBTAIN AND/OR MONITOR FINANCIAL DATA FROM ONE OR MORE CONTRIBUTING CONSUMERS OPERATION 203 from invoices/bills and/or receipt data provided to process for predictive event budgeting 200, and/or an associated computing system implemented financial management system, by one or more merchants and/or product and/or service providers. In one embodiment, the invoice/bill and/or receipt data includes "level 3" data indicating, among other things, the line item entry and product and/or service identification for each item purchased in the transaction.

As noted above, in one embodiment, process for predictive event budgeting 200 is associated with a computing system implemented financial management system, such as computing system implemented financial management system 180 of FIG. 1, that implements, includes, is accessed by, and/or is otherwise associated with process for predictive event budgeting 200 (FIG. 2). Some of these computing system implemented financial management systems provide the capability to obtain, receive, and/or process electronic copies of the invoices/receipts from one or more merchants and/or product and/or service providers, often in their specific formats, and then process and/or store the data for use by process for predictive event budgeting 200 in one of numerous locations by one of numerous methods known to those of skill in the art and/or as discussed herein.

In one embodiment, all, or part, of the financial data associated with one or more contributing consumers is obtained by process for predictive event budgeting 200, and/or a computing system implemented financial management system, at OBTAIN AND/OR MONITOR FINANCIAL DATA FROM ONE OR MORE CONTRIBUTING CONSUMERS OPERATION 203 from one or more of the following, either directly, or by using screen scraping technology, or a similar technology: websites sponsored by, controlled by, or associated with banks, debit cards and/or accounts, credit unions, credit cards and/or accounts, and/or credit card/account providers, asset accounts and/or asset account providers, or other financial resources, accounts and/or services used by a contributing consumer to pay for and/or conduct financial transactions; and/or computing system implemented applications sponsored by, controlled by, or associated with banks, debit cards and/or accounts, credit unions, credit cards and/or accounts, and/or credit card/account providers, asset accounts and/or asset account providers, or other financial resources, accounts and/or services used by a contributing consumer to pay for and/or conduct financial transactions.

In one embodiment, all, or part, of the financial data associated with one or more contributing consumers is obtained by process for predictive event budgeting 200 at OBTAIN AND/OR MONITOR FINANCIAL DATA FROM ONE OR MORE CONTRIBUTING CONSUMERS OPERATION 203 from contributing consumer input through a user interface device such as keyboard 107, 157, mouse 111, 161 of FIG. 1 or a touchpad, voice recognition system, or any other device capable of providing user input to a computing system and/or for translating user actions into computing system operations, whether available or known at the time of filing or as developed later.

Returning to FIG. 2, in one embodiment, all, or part, of the financial data associated with one or more contributing consumers is obtained by process for predictive event budgeting 200 at OBTAIN AND/OR MONITOR FINANCIAL DATA FROM ONE OR MORE CONTRIBUTING CONSUMERS OPERATION 203 from any combination of the above sources and/or from any other source of financial data associated with one or more contributing consumers whether known at the time of filing or as developed thereafter.

As noted above, in one embodiment, at OBTAIN AND/OR MONITOR FINANCIAL DATA FROM ONE OR MORE CONTRIBUTING CONSUMERS OPERATION 203 the contributing consumers agree to share all or part of their financial data with process for predictive event budgeting 200 and "user consumers" by any one of various means, including, tagging specific financial data as sharable data.

In one embodiment, at OBTAIN AND/OR MONITOR FINANCIAL DATA FROM ONE OR MORE CONTRIBUTING CONSUMERS OPERATION 203 the contributing consumers agree to share the financial data with user consumers on a transaction-by-transaction approval basis. In one embodiment, at OBTAIN AND/OR MONITOR FINANCIAL DATA FROM ONE OR MORE CONTRIBUTING CONSUMERS OPERATION 203, the contributing consumers agree to share the financial data with user consumers on a financial data category approval basis. In one embodiment, at OBTAIN AND/OR MONITOR FINANCIAL DATA FROM ONE OR MORE CONTRIBUTING CONSUMERS OPERATION 203 the contributing consumers agree to share the financial data with user consumers without restriction. In other embodiments, at OBTAIN AND/OR MONITOR FINANCIAL DATA FROM ONE OR MORE CONTRIBUTING CONSUMERS OPERATION 203 the contributing consumers agree to share the financial data with user consumers based on any restrictions/criteria dictated by the contributing consumer.

In one embodiment, at OBTAIN AND/OR MONITOR FINANCIAL DATA FROM ONE OR MORE CONTRIBUTING CONSUMERS OPERATION 203, the financial data to be shared is tagged as sharable by the contributing consumers using a user interface display and a user interface device, such as those defined herein, known in the art, or developed after the time of filing.

In one embodiment, at OBTAIN AND/OR MONITOR FINANCIAL DATA FROM ONE OR MORE CONTRIBUTING CONSUMERS OPERATION 203, specific financial transaction data is assigned a category/name and/or a description by the contributing consumer and one or more specific financial transactions are associated by the contributing consumer with a specific type of expense, such as utilities, or home maintenance, or transportation. In one embodiment, at OBTAIN AND/OR MONITOR FINANCIAL DATA FROM ONE OR MORE CONTRIBUTING CONSUMERS OPERATION 203, specific financial transaction data is assigned a category/name and/or a description by the contributing consumer and one or more given financial transactions are associated by the contributing consumer with a specific purchase or payment.

In one embodiment, at OBTAIN AND/OR MONITOR FINANCIAL DATA FROM ONE OR MORE CONTRIBUTING CONSUMERS OPERATION 203, specific financial transaction data is assigned a category/name and/or a description by a computing system implemented financial management system and a given financial transaction category, including one or more specific financial transactions, is associated by the computing system implemented financial management system with a specific type of expense, such as utilities, or home maintenance, or transportation. In one embodiment, at OBTAIN AND/OR MONITOR FINANCIAL DATA FROM ONE OR MORE CONTRIBUTING CONSUMERS OPERATION 203, specific financial transaction data is assigned a category/name and/or a description by the computing system implemented financial management system and a given financial transaction category, including one or more specific financial transactions, is associated by the computing system implemented financial management system with a specific purchase of a product and/or service.

In one embodiment, once the financial data associated with one or more contributing consumers is obtained at OBTAIN AND/OR MONITOR FINANCIAL DATA FROM ONE OR MORE CONTRIBUTING CONSUMERS OPERATION 203, the financial data obtained from the one or more contributing consumers is then monitored for variations/changes in the financial data.

In one embodiment, at OBTAIN AND/OR MONITOR FINANCIAL DATA FROM ONE OR MORE CONTRIBUTING CONSUMERS OPERATION 203 the financial data obtained from the one or more contributing consumers is monitored for variations/changes in the financial data by process for predictive event budgeting 200 and/or the provider of process for predictive event budgeting 200. In one embodiment, at OBTAIN AND/OR MONITOR FINANCIAL DATA FROM ONE OR MORE CONTRIBUTING CONSUMERS OPERATION 203 the financial data obtained from the one or more contributing consumers is monitored for variations/changes in the financial data by a computing system implemented financial management system, such as computing system implemented financial management system 180 of FIG. 1, and/or a provider of a computing system implemented financial management system.

In one embodiment, at OBTAIN AND/OR MONITOR FINANCIAL DATA FROM ONE OR MORE CONTRIBUTING CONSUMERS OPERATION 203 the financial data obtained from the one or more contributing consumers is monitored for variations/changes in the financial data by determining expenditures in one of more expense categories periodically and then comparing the expenditures in one of more expense categories with previous periods. In one embodiment, at OBTAIN AND/OR MONITOR FINANCIAL DATA FROM ONE OR MORE CONTRIBUTING CONSUMERS OPERATION 203 the financial data obtained from the one or more contributing consumers is monitored for variations/changes in the financial data by determining amounts associated with one of more recurring transactions periodically and then comparing the amounts associated the one of more recurring transactions with previous transactions. In one embodiment, at OBTAIN AND/OR MONITOR FINANCIAL DATA FROM ONE OR MORE CONTRIBUTING CONSUMERS OPERATION 203 the financial data obtained from the one or more contributing consumers is monitored for variations/changes in the financial data by setting threshold amounts of change in the financial data for a given expense category and/or transaction and then investigating any changes exceeding the threshold amount of change.

In one embodiment, at OBTAIN AND/OR MONITOR FINANCIAL DATA FROM ONE OR MORE CONTRIBUTING CONSUMERS OPERATION 203 the financial data obtained from the one or more contributing consumers is monitored for variations/changes in the financial data by any method, mechanism, process and/or procedure, or combinations thereof, discussed herein, known in the art at the time of filing, or as developed after the time filing.

In one embodiment once financial data associated with one or more contributing consumers is obtained from one or more sources and/or monitored at OBTAIN AND/OR MONITOR FINANCIAL DATA FROM ONE OR MORE CONTRIBUTING CONSUMERS OPERATION 203, process flow proceeds to IDENTIFY A CHANGE IN THE FINANCIAL DATA FROM ONE OR MORE CONTRIBUTING CONSUMERS OPERATION 205.

In one embodiment, at IDENTIFY A CHANGE IN THE FINANCIAL DATA FROM ONE OR MORE CONTRIBUTING CONSUMERS OPERATION 205 a change in the financial data associated with one or more contributing consumers of OBTAIN AND/OR MONITOR FINANCIAL DATA FROM ONE OR MORE CONTRIBUTING CONSUMERS OPERATION 203 is identified.

In one embodiment, once a change in the financial data associated with one or more contributing consumers of OBTAIN AND/OR MONITOR FINANCIAL DATA FROM ONE OR MORE CONTRIBUTING CONSUMERS OPERATION 203 is identified at IDENTIFY A CHANGE IN THE FINANCIAL DATA FROM ONE OR MORE CONTRIBUTING CONSUMERS OPERATION 205, process flow proceeds to IDENTIFY ONE OR MORE SPECIFIC EVENTS ASSOCIATED WITH THE CHANGE IN THE FINANCIAL DATA OPERATION 207.

In one embodiment, at IDENTIFY ONE OR MORE SPECIFIC EVENTS ASSOCIATED WITH THE CHANGE IN THE FINANCIAL DATA OPERATION 207 changes in the financial data identified at IDENTIFY A CHANGE IN THE FINANCIAL DATA FROM ONE OR MORE CONTRIBUTING CONSUMERS OPERATION 205 are associated with one or more specific events that led to the changes in the financial data.

In one embodiment, at IDENTIFY ONE OR MORE SPECIFIC EVENTS ASSOCIATED WITH THE CHANGE IN THE FINANCIAL DATA OPERATION 207 changes in the financial data identified at IDENTIFY A CHANGE IN THE FINANCIAL DATA FROM ONE OR MORE CONTRIBUTING CONSUMERS OPERATION 205 are associated with one or more specific events that led to the changes in the financial data such as, but not limited to: a change in marital status; having a child; a change of residence; a purchase/use of a given product and/or service; or any other event that may have an effect on a contributing consumer's financial data.

In one embodiment, at IDENTIFY ONE OR MORE SPECIFIC EVENTS ASSOCIATED WITH THE CHANGE IN THE FINANCIAL DATA OPERATION 207 changes in the financial data identified at IDENTIFY A CHANGE IN THE FINANCIAL DATA FROM ONE OR MORE CONTRIBUTING CONSUMERS OPERATION 205 are associated with one or more specific events that led to the changes in the financial data by the process for predictive event budgeting and/or the provider of the process for predictive event budgeting by analyzing the financial data associated with the contributing consumers and identifying change identifying transactions such as pregnancy/hospital transactions, changes of address, changes of payees, etc.

For instance, in one embodiment, when a change in financial data associated with a contributing consumer is identified at IDENTIFY A CHANGE IN THE FINANCIAL DATA FROM ONE OR MORE CONTRIBUTING CONSUMERS OPERATION 205, then, in one embodiment, at IDENTIFY ONE OR MORE SPECIFIC EVENTS ASSOCIATED WITH THE CHANGE IN THE FINANCIAL DATA OPERATION 207, process for predictive event budgeting 200 searches through the recent financial data associated with the contributing consumer for types of transactions that may identify the event(s) causing the change. Some examples include, but are not limited to: hospital bills; down payments on cars or other major purchases; a new payee; a new mortgage payment; a new payer on a paycheck; a new payee on a recurring bill; or any other transaction indicative of an event.

In one embodiment, if transactions that may identify the event(s) are found, process for predictive event budgeting 200 contacts the contributing consumer to confirm the event using any of means for contacting a contributing consumer including, but not limited to, data transfer, e-mail, text messaging, postal service, telephone. etc. as discussed herein, known in the art, and/or as developed after the time of filing.

In one embodiment, at IDENTIFY ONE OR MORE SPECIFIC EVENTS ASSOCIATED WITH THE CHANGE IN THE FINANCIAL DATA OPERATION 207 changes in the financial data identified at IDENTIFY A CHANGE IN THE FINANCIAL DATA FROM ONE OR MORE CONTRIBUTING CONSUMERS OPERATION 205 are associated with one or more specific events that led to the changes in the financial data by contacting the contributing consumer whose data includes the change and requesting the contributing consumer identify one or more events associated with the change in the financial data. In one embodiment, the contributing consumer is contacted by process for predictive event budgeting 200 and/or the provider of process for predictive event budgeting 200. In one embodiment, the contributing consumer is contacted by process for predictive event budgeting 200 and/or the provider of process for predictive event budgeting 200 using any of means for contacting a contributing consumer including, but not limited to, data transfer, e-mail, text messaging, postal service, telephone. etc. as discussed herein, known in the art, and/or as developed after the time of filing.

In one embodiment, at IDENTIFY ONE OR MORE SPECIFIC EVENTS ASSOCIATED WITH THE CHANGE IN THE FINANCIAL DATA OPERATION 207 changes in the financial data identified at IDENTIFY A CHANGE IN THE FINANCIAL DATA FROM ONE OR MORE CONTRIBUTING CONSUMERS OPERATION 205 are associated with one or more specific events that led to the changes in the financial data by the contributing consumer input using a user interface display and a user interface device, such as those defined herein, known in the art, or developed after the time of filing. In one embodiment, specific financial transaction data is categorized as being associated with one or more specific events by the contributing consumer prior to the change be indentified at IDENTIFY A CHANGE IN THE FINANCIAL DATA FROM ONE OR MORE CONTRIBUTING CONSUMERS OPERATION 205.

In one embodiment, once changes in the financial data identified at IDENTIFY A CHANGE IN THE FINANCIAL DATA FROM ONE OR MORE CONTRIBUTING CONSUMERS OPERATION 205 are associated with one or more specific events that led to the changes in the financial data at IDENTIFY ONE OR MORE SPECIFIC EVENTS ASSOCIATED WITH THE CHANGE IN THE FINANCIAL DATA OPERATION 207, process flow proceeds to AGGREGATE AND/OR CATEGORIZE THE CHANGE IN THE FINANCIAL DATA BASED ON THE ONE OR MORE SPECIFIC EVENTS ASSOCIATED WITH THE CHANGE IN THE FINANCIAL DATA AND/OR DATA RELATED TO A CONTRIBUTING CONSUMER OPERATION 209.

In one embodiment, at AGGREGATE AND/OR CATEGORIZE THE CHANGE IN THE FINANCIAL DATA BASED ON THE ONE OR MORE SPECIFIC EVENTS ASSOCIATED WITH THE CHANGE IN THE FINANCIAL DATA AND/OR DATA RELATED TO A CONTRIBUTING CONSUMER OPERATION 209 the data representing the event related changes in the financial data from one or more contributing consumers is analyzed and aggregated and/or categorized according to the one or more events determined to have caused the event related changes in the financial data of IDENTIFY ONE OR MORE SPECIFIC EVENTS ASSOCIATED WITH THE CHANGE IN THE FINANCIAL DATA OPERATION 207 and/or one or more criteria/parameters associated with the data and/or the contributing consumer.

In one embodiment, at AGGREGATE AND/OR CATEGORIZE THE CHANGE IN THE FINANCIAL DATA BASED ON THE ONE OR MORE SPECIFIC EVENTS ASSOCIATED WITH THE CHANGE IN THE FINANCIAL DATA AND/OR DATA RELATED TO A CONTRIBUTING CONSUMER OPERATION 209 the financial data obtained from one or more contributing consumers at OBTAIN AND/OR MONITOR FINANCIAL DATA FROM ONE OR MORE CONTRIBUTING CONSUMERS OPERATION 203 is categorized, and/or re-categorized as determined by process for predictive event budgeting 200.

In one embodiment, at AGGREGATE AND/OR CATEGORIZE THE CHANGE IN THE FINANCIAL DATA BASED ON THE ONE OR MORE SPECIFIC EVENTS ASSOCIATED WITH THE CHANGE IN THE FINANCIAL DATA AND/OR DATA RELATED TO A CONTRIBUTING CONSUMER OPERATION 209 the data representing the event related changes in the financial data from one or more contributing consumers is analyzed and aggregated and/or categorized according to the one or more events determined to have caused the event related changes in the financial data of IDENTIFY ONE OR MORE SPECIFIC EVENTS ASSOCIATED WITH THE CHANGE IN THE FINANCIAL DATA OPERATION 207 and/or according to: the contributing consumer assigned category; and/or the process for predictive event budgeting 200 assigned category; and/or a computing system implemented financial management system assigned category, associated with the financial data.

In one embodiment, at AGGREGATE AND/OR CATEGORIZE THE CHANGE IN THE FINANCIAL DATA BASED ON THE ONE OR MORE SPECIFIC EVENTS ASSOCIATED WITH THE CHANGE IN THE FINANCIAL DATA AND/OR DATA RELATED TO A CONTRIBUTING CONSUMER OPERATION 209 the data representing the event related changes in the financial data from one or more contributing consumers is analyzed and aggregated and/or categorized according to the one or more events determined to have caused the event related changes in the financial data of IDENTIFY ONE OR MORE SPECIFIC EVENTS ASSOCIATED WITH THE CHANGE IN THE FINANCIAL DATA OPERATION 207 and/or according to: the contributing consumer assigned category; and/or the process for predictive event budgeting 200 assigned category; and/or the computing system implemented financial management system category, associated with the financial data and one or more parameters associated with the contributing consumer.

In one embodiment, at AGGREGATE AND/OR CATEGORIZE THE CHANGE IN THE FINANCIAL DATA BASED ON THE ONE OR MORE SPECIFIC EVENTS ASSOCIATED WITH THE CHANGE IN THE FINANCIAL DATA AND/OR DATA RELATED TO A CONTRIBUTING CONSUMER OPERATION 209 the data representing the event related changes in the financial data from one or more contributing consumers is analyzed and aggregated and/or categorized according to the one or more events determined to have caused the event related changes in the financial data of IDENTIFY ONE OR MORE SPECIFIC EVENTS ASSOCIATED WITH THE CHANGE IN THE FINANCIAL DATA OPERATION 207 and/or one or more parameters associated with the contributing consumer such as, but not limited to one or more of the following: the contributing consumer's area of residence/zip code; the contributing consumer's total assets; details regarding one or more of the contributing consumer's assets, such as the size and location of the contributing consumer's house and/or the type of car the contributing consumer drives; the contributing consumer's total income and/or the percentage of the contributing consumer's income spent in the category of the financial transaction data; the contributing consumer's net worth; the contributing consumer's average discretionary spending and/or the percentage of the contributing consumer's discretionary spending spent in the category of the financial transaction data; the contributing consumer's age group; various demographic data regarding the contributing consumer and/or the contributing consumer's spending; the contributing consumer's marital status and/or number of dependents; the contributing consumer's commute; the contributing consumer's yearly mileage; the contributing consumer's profession; and/or any other data regarding the contributing consumer's general and/or overall financial status desired and/or available and/or obtained at OBTAIN AND/OR MONITOR FINANCIAL DATA FROM ONE OR MORE CONTRIBUTING CONSUMERS OPERATION 203.

In one embodiment, at AGGREGATE AND/OR CATEGORIZE THE CHANGE IN THE FINANCIAL DATA BASED ON THE ONE OR MORE SPECIFIC EVENTS ASSOCIATED WITH THE CHANGE IN THE FINANCIAL DATA AND/OR DATA RELATED TO A CONTRIBUTING CONSUMER OPERATION 209 the data representing the event related changes in the financial data from one or more contributing consumers is analyzed and aggregated and/or categorized according to the one or more events determined to have caused the event related changes in the financial data of IDENTIFY ONE OR MORE SPECIFIC EVENTS ASSOCIATED WITH THE CHANGE IN THE FINANCIAL DATA OPERATION 207 and/or any other criteria desired using any one the numerous methods for analyzing and aggregating data.

Methods, means, processes, procedures and mechanisms for analyzing, aggregating, and categorizing data according to various parameters/criteria as well known in the art. Consequently, a more detailed discussion of any specific methods, means, processes, procedures and mechanisms for analyzing, aggregating, and categorizing data, such as, in one embodiment, is performed at AGGREGATE AND/OR CATEGORIZE THE CHANGE IN THE FINANCIAL DATA BASED ON THE ONE OR MORE SPECIFIC EVENTS ASSOCIATED WITH THE CHANGE IN THE FINANCIAL DATA AND/OR DATA RELATED TO A CONTRIBUTING CONSUMER OPERATION 209, is omitted here to avoid detracting from the invention.

In one embodiment, once the data representing the event related changes in the financial data from one or more contributing consumers is analyzed and aggregated and/or categorized according to the one or more events determined to have caused the event related changes in the financial data of IDENTIFY ONE OR MORE SPECIFIC EVENTS ASSOCIATED WITH THE CHANGE IN THE FINANCIAL DATA OPERATION 207 and/or one or more criteria/parameters associated with the data and/or the contributing consumer at AGGREGATE AND/OR CATEGORIZE THE CHANGE IN THE FINANCIAL DATA BASED ON THE ONE OR MORE SPECIFIC EVENTS ASSOCIATED WITH THE CHANGE IN THE FINANCIAL DATA AND/OR DATA RELATED TO A CONTRIBUTING CONSUMER OPERATION 209, process flow proceeds to STORE THE AGGREGATED AND/OR CATEGORIZED EVENT AND RELATED CHANGE IN FINANCIAL DATA OPERATION 211.

In one embodiment, at STORE THE AGGREGATED AND/OR CATEGORIZED EVENT AND RELATED CHANGE IN FINANCIAL DATA OPERATION 211, the aggregated and/or categorized data representing the event related changes in the financial data of AGGREGATE AND/OR CATEGORIZE THE CHANGE IN THE FINANCIAL DATA BASED ON THE ONE OR MORE SPECIFIC EVENTS ASSOCIATED WITH THE CHANGE IN THE FINANCIAL DATA AND/OR DATA RELATED TO A CONTRIBUTING CONSUMER OPERATION 209 is stored by, or under the control of, process for predictive event budgeting 200.

In one embodiment, at STORE THE AGGREGATED AND/OR CATEGORIZED EVENT AND RELATED CHANGE IN FINANCIAL DATA OPERATION 211, the aggregated and/or categorized data representing the event related changes in the financial data is stored in whole, or in part, in a database maintained by, accessible by, owned by, or otherwise related to: process for predictive event budgeting 200, and/or a provider of process for predictive event budgeting 200; a computing system implemented financial management system, and/or a provider of a computing system implemented financial management system; or any other party, by any one of the numerous mechanisms known to those of skill in the art. For instance, in one embodiment, the data, in whole, or in part, is stored in a memory system, such as memory systems 103 and 153 or server memory system 123, or database 170, of FIG. 1, or in a cache memory, such as cache memories 103A/153A of FIG. 1, or in any main memory or mass memory, associated with a computing system, such as computing systems 100 or 150 described above. In one embodiment, the data, in whole, or in part, is stored in any computing system and/or server system, such as computing systems 100 or 150 or server system 120, or other device, in another location, or on/in a computer readable medium, and/or any other computer program product, as defined herein. In one embodiment, the data, in whole, or in part, is stored on a webpage, in a web-based system or on a public network such as the Internet.

Returning to FIG. 2, in some embodiments, the aggregated and/or categorized data representing the event related changes in the financial data stored as described above is maintained, in whole, or in part, by: process for predictive event budgeting 200, and/or a provider of process for predictive event budgeting 200; a computing system implemented financial management system, and/or a provider of a computing system implemented financial management system; a third party data storage institution; any third party service or institution; or any other parties. In one embodiment, access to the aggregated and/or categorized data representing the event related changes in the financial data is provided to process for predictive event budgeting 200, and/or a computing system implemented financial management system, by providing access to the data and/or providing the data on a computer program product.

In one embodiment, once the aggregated and/or categorized data representing the event related changes in the financial data of AGGREGATE AND/OR CATEGORIZE THE CHANGE IN THE FINANCIAL DATA BASED ON THE ONE OR MORE SPECIFIC EVENTS ASSOCIATED WITH THE CHANGE IN THE FINANCIAL DATA AND/OR DATA RELATED TO A CONTRIBUTING CONSUMER OPERATION 209 is stored by, or under the control of, process for predictive event budgeting 200 at STORE THE AGGREGATED AND/OR CATEGORIZED EVENT AND RELATED CHANGE IN FINANCIAL DATA OPERATION 211, process flow proceeds to A USER CONSUMER INITIATES A SEARCH FOR PREDICTIVE COST DATA ASSOCIATED WITH A GIVEN EVENT OPERATION 213.

In one embodiment, at A USER CONSUMER INITIATES A SEARCH FOR PREDICTIVE COST DATA ASSOCIATED WITH A GIVEN EVENT OPERATION 213 a "user consumer" initiates a request for predictive event cost data associated with one or more events.

In one embodiment, at A USER CONSUMER INITIATES A SEARCH FOR PREDICTIVE COST DATA ASSOCIATED WITH A GIVEN EVENT OPERATION 213 the user consumer initiates a request for predictive event cost data associated with one or more events using a user interface display and a user interface device, such as defined herein, known in the art, and/or as developed after the time of filing. In one embodiment, at A USER CONSUMER INITIATES A SEARCH FOR PREDICTIVE COST DATA ASSOCIATED WITH A GIVEN EVENT OPERATION 213 the user consumer initiates a request for predictive event cost data associated with one or more events using a computing system, such as defined herein, known in the art, and/or as developed after the time of filing. In one embodiment, at A USER CONSUMER INITIATES A SEARCH FOR PREDICTIVE COST DATA ASSOCIATED WITH A GIVEN EVENT OPERATION 213 the user consumer initiates a request for predictive event cost data associated with one or more events over a network such as defined herein, known in the art, and/or as developed after the time of filing.

In one embodiment, as part of the user consumer initiated request for predictive event cost data associated with one or more events, the user consumer identifies the proposed event such as, but not limited to: having a baby, a move to the identified location; buying a house; renting a house; renting an apartment; purchasing a product and/or service; or any other specified one or more "events" as defined herein, known in the art at the time of filing, or as identified after the time of filing.

In one embodiment, as part of the user consumer initiated request for predictive event cost data associated with one or more events, the user consumer provides the identification data of a location such as a city, town, state, or region of interest. The specific location is indentified using various data including, but not limited to: a common name; a postal code; a section of a city and/or town; a specific neighborhood in a city and/or town; nearby landmarks and/or known features; a specific block; a specific address; a GPS coordinate; a longitude and latitude; or any other means for identifying a location, known in the art, and/or as developed after the time of filing.

In one embodiment, as part of the user consumer initiated request for predictive event cost data associated with one or more events, the user consumer provides general financial data associated with the user consumer such as, but not limited to: the user consumer's total assets; details regarding one or more of the user consumer's assets, such as the size and location of the user consumer's house and/or the type of car the user consumer drives; the user consumer's total income and/or the percentage of the user consumer's income spent in a given category of financial data; the user consumer's net worth; the user consumer's average discretionary spending and/or the percentage of the user consumer's discretionary spending spent in a given category of financial data; the user consumer's age group; various demographic data regarding the user consumer and/or the user consumer's spending; the user consumer's marital status and/or number of dependents; the user consumer's expected commute; the user consumer's yearly mileage; the user consumer's profession; and/or any other data regarding the user consumer's general and/or overall financial status desired.

In one embodiment, the general financial data associated with the user consumer is obtained from one or more computing system implemented financial management systems associated with the user consumer.

In one embodiment, the general financial data associated with the user consumer is used to find contributor consumers, and contributor consumer financial data, most closely related to the user consumer's situation.

In one embodiment, as part of the user consumer initiated request for predictive event cost data associated with one or more events, the user consumer provides search criteria and/or parameters such as a request to see all results from specific categories of contributing consumers, or from contributing consumers having specific financial and/or demographic attributes.

Recall that, in one embodiment, at OBTAIN FINANCIAL DATA ASSOCIATED WITH THE PURCHASE OF ONE OR MORE PRODUCTS AND/OR SERVICES FROM ONE OR MORE CONTRIBUTING CONSUMERS OPERATION 203, the contributing consumer's general and/or overall financial status and/or demographics data is obtained. In one embodiment, at AGGREGATE AND/OR CATEGORIZE THE CHANGE IN THE FINANCIAL DATA BASED ON THE ONE OR MORE SPECIFIC EVENTS ASSOCIATED WITH THE CHANGE IN THE FINANCIAL DATA AND/OR DATA RELATED TO A CONTRIBUTING CONSUMER OPERATION 209, the contributing consumer's general and/or overall financial status and/or demographics data is used to categorize and/or identify contributing consumers, and/or their financial data contributed, according to various criteria. In one embodiment, at A USER CONSUMER INITIATES A SEARCH FOR PREDICTIVE COST DATA ASSOCIATED WITH A GIVEN EVENT OPERATION 213 a user consumer can then narrow search results to results from specific "types" of contributing consumers with the specific types of contributing consumers being identified based on the contributing consumer's general and/or overall financial status and/or demographics data of OBTAIN AND/OR MONITOR FINANCIAL DATA FROM ONE OR MORE CONTRIBUTING CONSUMERS OPERATION 203 and the contributing consumer categorizations of AGGREGATE AND/OR CATEGORIZE THE CHANGE IN THE FINANCIAL DATA BASED ON THE ONE OR MORE SPECIFIC EVENTS ASSOCIATED WITH THE CHANGE IN THE FINANCIAL DATA AND/OR DATA RELATED TO A CONTRIBUTING CONSUMER OPERATION 209.

In one embodiment, once a user consumer initiates a request for predictive event cost data associated with one or more events at A USER CONSUMER INITIATES A SEARCH FOR PREDICTIVE COST DATA ASSOCIATED WITH A GIVEN EVENT OPERATION 213, process flow proceeds to SEARCH THE AGGREGATED AND/OR CATEGORIZED EVENT AND RELATED CHANGE IN FINANCIAL DATA FROM THE ONE OR MORE CONTRIBUTING CONSUMERS FOR DATA ASSOCIATED WITH THE GIVEN EVENT OF THE USER CONSUMER INITIATED SEARCH OPERATION 215.

In one embodiment, at SEARCH THE AGGREGATED AND/OR CATEGORIZED EVENT AND RELATED CHANGE IN FINANCIAL DATA FROM THE ONE OR MORE CONTRIBUTING CONSUMERS FOR DATA ASSOCIATED WITH THE GIVEN EVENT OF THE USER CONSUMER INITIATED SEARCH OPERATION 215 the aggregated and/or categorized data representing the event related changes in the financial data for the one or more contributing consumers stored at STORE THE AGGREGATED AND/OR CATEGORIZED EVENT AND RELATED CHANGE IN FINANCIAL DATA OPERATION 211 is then searched based on one or more search parameters provided by and/or associated with the user consumer from obtained of A USER CONSUMER INITIATES A SEARCH FOR PREDICTIVE COST DATA ASSOCIATED WITH A GIVEN EVENT OPERATION 213. Results data representing the changes in the financial data for one or more similarly situated contributing consumers associated the specified event is then obtained.

In one embodiment, at SEARCH THE AGGREGATED AND/OR CATEGORIZED EVENT AND RELATED CHANGE IN FINANCIAL DATA FROM THE ONE OR MORE CONTRIBUTING CONSUMERS FOR DATA ASSOCIATED WITH THE GIVEN EVENT OF THE USER CONSUMER INITIATED SEARCH OPERATION 215 the aggregated and/or categorized data representing the event related changes in the financial data is searched and search results data regarding cost and/or changes in financial data associated with one or more events, and/or most closely matching any user consumer search parameters and/or criteria of A USER CONSUMER INITIATES A SEARCH FOR PREDICTIVE COST DATA ASSOCIATED WITH A GIVEN EVENT OPERATION 213, is obtained using any search method and/or search engine known in the art at the time of filing, or as developed after the time of filing.

In one embodiment, the search results data regarding cost and/or changes in financial data associated with one or more events includes data indicating all financial transactions, and therefore all bills and/or bill payments, associated with the specified one or more events of the user consumer initiated search request.

Numerous, methods, means, mechanisms, processes and/or procedures for analyzing and/or searching data in response to various search criteria/parameters, are well known to those of skill in the art. Consequently, a more detailed discussion of methods, means, mechanisms, processes and/or procedures for analyzing and/or searching data in response to various search criteria/parameters, such as the analysis/search performed, in one embodiment, at SEARCH THE AGGREGATED AND/OR CATEGORIZED EVENT AND RELATED CHANGE IN FINANCIAL DATA FROM THE ONE OR MORE CONTRIBUTING CONSUMERS FOR DATA ASSOCIATED WITH THE GIVEN EVENT OF THE USER CONSUMER INITIATED SEARCH OPERATION 215, is omitted here to avoid detracting from the invention.

In one embodiment, once the aggregated and/or categorized data representing the event related changes in the financial data stored at STORE THE AGGREGATED AND/OR CATEGORIZED EVENT AND RELATED CHANGE IN FINANCIAL DATA OPERATION 211 is searched and results data regarding cost and/or changes in financial data associated with one or more events of A USER CONSUMER INITIATES A SEARCH FOR PREDICTIVE COST DATA ASSOCIATED WITH A GIVEN EVENT OPERATION 213 is obtained at SEARCH THE AGGREGATED AND/OR CATEGORIZED EVENT AND RELATED CHANGE IN FINANCIAL DATA FROM THE ONE OR MORE CONTRIBUTING CONSUMERS FOR DATA ASSOCIATED WITH THE GIVEN EVENT OF THE USER CONSUMER INITIATED SEARCH OPERATION 215, process flow proceeds to PROVIDE THE USER CONSUMER WITH RESULTS DATA FROM THE SEARCH OF THE AGGREGATED AND/OR CATEGORIZED EVENT AND RELATED CHANGE IN FINANCIAL DATA FROM THE ONE OR MORE CONTRIBUTING CONSUMERS OPERATION 217.

In one embodiment, at PROVIDE THE USER CONSUMER WITH RESULTS DATA FROM THE SEARCH OF THE AGGREGATED AND/OR CATEGORIZED EVENT AND RELATED CHANGE IN FINANCIAL DATA FROM THE ONE OR MORE CONTRIBUTING CONSUMERS OPERATION 217, the results data obtained at SEARCH THE AGGREGATED AND/OR CATEGORIZED EVENT AND RELATED CHANGE IN FINANCIAL DATA FROM THE ONE OR MORE CONTRIBUTING CONSUMERS FOR DATA ASSOCIATED WITH THE GIVEN EVENT OF THE USER CONSUMER INITIATED SEARCH OPERATION 215 is presented to the user consumer in any one of various data and/or report formats.

In one embodiment, at PROVIDE THE USER CONSUMER WITH RESULTS DATA FROM THE SEARCH OF THE AGGREGATED AND/OR CATEGORIZED EVENT AND RELATED CHANGE IN FINANCIAL DATA FROM THE ONE OR MORE CONTRIBUTING CONSUMERS OPERATION 217 the search results data regarding cost and/or changes in financial data associated with one or more events, and/or most closely matching any user consumer search parameters and/or criteria of A USER CONSUMER INITIATES A SEARCH FOR PREDICTIVE COST DATA ASSOCIATED WITH A GIVEN EVENT OPERATION 213, is presented to the user consumer as a listing of specific bills paid by the one or more contributor consumers associated with the specified one or more events of the user consumer initiated search request.

In one embodiment, at PROVIDE THE USER CONSUMER WITH RESULTS DATA FROM THE SEARCH OF THE AGGREGATED AND/OR CATEGORIZED EVENT AND RELATED CHANGE IN FINANCIAL DATA FROM THE ONE OR MORE CONTRIBUTING CONSUMERS OPERATION 217 the search results data regarding cost and/or changes in financial data associated with one or more events, and/or most closely matching any user consumer search parameters and/or criteria of A USER CONSUMER INITIATES A SEARCH FOR PREDICTIVE COST DATA ASSOCIATED WITH A GIVEN EVENT OPERATION 213, is presented to the user consumer as a listing of costs in specific categories paid by the one or more contributor consumers associated with the given one or more events of the user consumer initiated search request. In this way, a user consumer can potentially see all bills, including bills associated with potentially hidden costs of which the user consumer may not have been aware absent process for predictive event budgeting 200.

In one embodiment, at PROVIDE THE USER CONSUMER WITH RESULTS DATA FROM THE SEARCH OF THE AGGREGATED AND/OR CATEGORIZED EVENT AND RELATED CHANGE IN FINANCIAL DATA FROM THE ONE OR MORE CONTRIBUTING CONSUMERS OPERATION 217, the search results data regarding cost and/or changes in financial data associated with one or more events, and/or most closely matching any user consumer search parameters and/or criteria of A USER CONSUMER INITIATES A SEARCH FOR PREDICTIVE COST DATA ASSOCIATED WITH A GIVEN EVENT OPERATION 213, is presented to the user consumer as a listing of specific bills associated with the specified one or more events of the user consumer initiated search request in a month-to-month comparison. In this way a user consumer can see all bills, including bills associated with potentially hidden costs the user consumer was not aware of, and potential monthly and/or seasonal fluctuations in those bills of which the user consumer may not have been aware absent process for predictive event budgeting 200.

In one embodiment, at PROVIDE THE USER CONSUMER WITH RESULTS DATA FROM THE SEARCH OF THE AGGREGATED AND/OR CATEGORIZED EVENT AND RELATED CHANGE IN FINANCIAL DATA FROM THE ONE OR MORE CONTRIBUTING CONSUMERS OPERATION 217, the user consumer is alerted to potential upcoming bills and/or bill fluctuations associated with the specified one or more events of the user consumer initiated search request manually in response to a specific user consumer request. In one embodiment, at PROVIDE THE USER CONSUMER WITH RESULTS DATA FROM THE SEARCH OF THE AGGREGATED AND/OR CATEGORIZED EVENT AND RELATED CHANGE IN FINANCIAL DATA FROM THE ONE OR MORE CONTRIBUTING CONSUMERS OPERATION 217, the user consumer is shown results and/or alerted to potential upcoming bills and/or bill fluctuations associated with the specified one or more events of the user consumer initiated search request semi-automatically, or automatically, on a periodic basis. In one embodiment, at PROVIDE THE USER CONSUMER WITH RESULTS DATA FROM THE SEARCH OF THE AGGREGATED AND/OR CATEGORIZED EVENT AND RELATED CHANGE IN FINANCIAL DATA FROM THE ONE OR MORE CONTRIBUTING CONSUMERS OPERATION 217, the user consumer is shown results and/or alerted to potential upcoming bills and/or bill fluctuations associated with the specified one or more events of the user consumer initiated search request automatically on a periodic basis and well in advance of the predicted bills and/or bill fluctuations associated with the specified one or more events of the user consumer initiated search request in order to provide the user consumer the opportunity to budget for the predicted fluctuations.

In one embodiment, at PROVIDE THE USER CONSUMER WITH RESULTS DATA FROM THE SEARCH OF THE AGGREGATED AND/OR CATEGORIZED EVENT AND RELATED CHANGE IN FINANCIAL DATA FROM THE ONE OR MORE CONTRIBUTING CONSUMERS OPERATION 217, the results data obtained at SEARCH THE AGGREGATED AND/OR CATEGORIZED EVENT AND RELATED CHANGE IN FINANCIAL DATA FROM THE ONE OR MORE CONTRIBUTING CONSUMERS FOR DATA ASSOCIATED WITH THE GIVEN EVENT OF THE USER CONSUMER INITIATED SEARCH OPERATION 215 is presented to the user consumer in any one of various data and/or report formats using any of the means for data and/or information transfer discussed herein, known in the art, and/or as developed after the time of filing.

In one embodiment, once the results data obtained at SEARCH THE AGGREGATED AND/OR CATEGORIZED EVENT AND RELATED CHANGE IN FINANCIAL DATA FROM THE ONE OR MORE CONTRIBUTING CONSUMERS FOR DATA ASSOCIATED WITH THE GIVEN EVENT OF THE USER CONSUMER INITIATED SEARCH OPERATION 215 is presented to the user consumer in any one of various data and/or report formats at PROVIDE THE USER CONSUMER WITH RESULTS DATA FROM THE SEARCH OF THE AGGREGATED AND/OR CATEGORIZED EVENT AND RELATED CHANGE IN FINANCIAL DATA FROM THE ONE OR MORE CONTRIBUTING CONSUMERS OPERATION 217, process flow proceeds to EXIT OPERATION 230. In one embodiment, at EXIT OPERATION 230, process for predictive event budgeting 200 is exited to await new data.

In the discussion above, certain aspects of one embodiment include process steps and/or operations and/or instructions described herein for illustrative purposes in a particular order and/or grouping. However, the particular order and/or grouping shown and discussed herein is illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein does not limit the scope of the invention as claimed below.

Using process for predictive event budgeting 200, a user consumer is provided the opportunity to see financial data associated with other similarly situated consumer's and, in particular, see what costs and/or changes in the financial data are associated with a specified life and/or financial event. Consequently, using the process for predictive event budgeting 200, a consumer can learn from the experience of similarly situated consumers and thereby more readily determine the actual costs that are associated with a given event. Therefore, using process for predictive event budgeting 200, the consumer can accurately budget for an event well in advance and is far less likely to be faced with unexpected costs associated with a life and/or financial event.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "analyzing", "obtaining", "identifying", "associating", "aggregating"; "initiating"; "collecting", "creating", "transferring", "storing", "searching", "comparing", "providing", etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored via a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s are identified using a particular nomenclature for ease of description and understanding, but other nomenclature is often used in the art to identify equivalent operations.

In the discussion above, certain aspects of one embodiment include process steps and/or operations and/or instructions described herein for illustrative purposes in a particular order and/or grouping. However, the particular order and/or grouping shown and discussed herein is illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein does not limit the scope of the invention as claimed below.

Therefore, numerous variations, whether explicitly provided for by the specification or implied by the specification or not, may be implemented by one of skill in the art in view of this disclosure.

What is claimed is:
1. A system for predictive event budgeting comprising:
a processor; and
a memory coupled to the processor, the memory having processor-executable instructions stored therein which when executed by the processor perform a process for predictive event budgeting comprising:
obtaining contributing consumer financial data from two or more contributing consumers, the contributing consumer financial data including a plurality of transactions from each of the two or more contributing consumers, each transaction within the plurality of transactions from each contributing consumer having been previously individually designated on a transaction by transaction basis by the respective contributing consumer as being sharable with a user consumer;
monitoring the contributing consumer financial data from the two or more contributing consumers for changes in the contributing consumer financial data from two or more contributing consumers;
identifying one or more changes in the contributing consumer financial data associated with one or more of the two or more contributing consumers, resulting in changed financial data;
identifying one or more specific events associated with the identified one or more changes in the changed financial data;
aggregating and categorizing the changed financial data based, at least in part, on the identified one or more specific events, resulting in aggregated data;
storing the aggregated data;

in response to a user consumer initiated search for costs data associated with one or more specified events includes— searching the aggregated and categorized data for aggregated data that is associated with the user consumer specified one or more events, resulting in user consumer events data; and the user consumer providing identification data for a given location and data identifying a specific event associated with the given location;

and providing the user consumer with the user consumer events data, which includes a listing of all costs associated with the one or more events found as a result of the search of the aggregated data.

2. The system for predictive event budgeting of claim 1, wherein;

obtaining contributing consumer financial data from two or more contributing consumers comprises:

obtaining contributing consumer financial data from the two or more contributing consumers from a computing system implemented financial management system.

3. The system for predictive event budgeting of claim 1, wherein;

monitoring the contributing consumer financial data from the two or more contributing consumers for changes in the contributing consumer financial data from two or more contributing consumers comprises:

monitoring the contributing consumer financial data from the two or more contributing consumers by categories assigned to the financial data from the two or more contributing consumers by a computing system implemented financial management system.

4. The system for predictive event budgeting of claim 1, wherein;

monitoring the contributing consumer financial data from the two or more contributing consumers for changes in the contributing consumer financial data from two or more contributing consumers comprises:

monitoring the contributing consumer financial data from the two or more contributing consumers by categories assigned to the contributing consumer financial data from the two or more contributing consumers by one or more contributing consumers.

5. The system for predictive event budgeting of claim 1, wherein;

monitoring the contributing consumer financial data from the two or more contributing consumers for changes in the contributing consumer financial data from two or more contributing consumers comprises:

monitoring the contributing consumer financial data from the two or more contributing consumers by categories assigned to the contributing consumer financial data from the two or more contributing consumers by the process for predictive event budgeting.

6. The system for predictive event budgeting of claim 1, wherein;

monitoring the contributing consumer financial data from the two or more contributing consumers for changes in the contributing consumer financial data from two or more contributing consumers comprises:

monitoring one or more financial transactions of the contributing consumer financial data from the two or more contributing consumers.

7. The system for predictive event budgeting of claim 1, wherein;

identifying one or more specific events associated with the identified one or more changes in the changed financial data comprises:

one or more respective contributing consumers identifying the one or more specific events associated with the identified one or more changes in the changed financial data associated with respective ones of the contributing consumers.

8. The system for predictive event budgeting of claim 1, wherein;

identifying one or more specific events associated with the identified one or more changes in the changed financial data comprises:

contacting one or more respective contributing consumers and requesting the one or more respective contributing consumers identify the one or more specific events associated with the identified one or more changes in the changed financial data associated with respective ones of the contributing consumers.

9. The system for predictive event budgeting of claim 1, wherein;

aggregating and categorizing the changed financial data based, at least in part, on the identified one or more specific events, resulting in aggregated data comprises:

aggregating and categorizing data the changed financial data based on the identified one or more specific events and one or more of the following additional contributing consumer parameters, resulting in aggregated data, the parameters chosen from the group of contributing consumer parameters consisting of:

the contributing consumer's total assets;

details regarding one or more of the contributing consumer's assets;

the contributing consumer's total income;

the percentage of the contributing consumer's income spent in the category of the financial data;

the contributing consumer's net worth;

the contributing consumer's average discretionary spending;

the percentage of the contributing consumer's discretionary spending spent in the category of the financial data;

the contributing consumer's age group;

the contributing consumer's marital status;

the contributing consumer's number of dependents;

the contributing consumer's commute;

the contributing consumer's yearly mileage; and the contributing consumer's profession.

10. The system for predictive event budgeting of claim 1, wherein;

the user consumer initiated search for costs data associated with one or more specified events includes the user consumer providing general financial data associated with the user consumer, the general financial data associated with the user consumer being chosen from the group of general financial data associated with the user consumer consisting of:

the user consumer's total assets;

details regarding one or more of the user consumer's assets;

the user consumer's total income;

the percentage of the user consumer's income spent in the category of the financial data;

the user consumer's net worth;

the user consumer's average discretionary spending;

the percentage of the user consumer's discretionary spending spent in a given category of expense;

the user consumer's age group;

the user consumer's marital status;
the user consumer's number of dependents;
the user consumer's commute;
the user consumer's yearly mileage; and
the user consumer's profession.

11. The system for predictive event budgeting of claim 1, wherein;
the specific one or more events includes a specific event chosen from the group of events consisting of:
a baby or an expected baby;
a move to the given location;
buying a house;
renting a house;
renting an apartment;
purchasing a given service; and
purchasing a given product.

12. The system for predictive event budgeting of claim 1, wherein;
the user consumer initiated search for costs data associated with one or more specified events includes the user consumer providing user consumer search parameters for searching the aggregated and categorized data representing the one or more changes in the financial data associated with one or more of the one or more contributing consumers, the user consumer search parameters including one or more user consumer search parameters chosen from the group of user consumer search parameters consisting of:

the contributing consumer having total assets within a range defined by the user consumer;
the contributing consumer having total income within a range defined by the user consumer;
the contributing consumer having income spent in the category of the financial data within a range defined by the user consumer;
the contributing consumer having a net worth within a range defined by the user consumer;
the contributing consumer having average discretionary spending within a range defined by the user consumer;
the contributing consumer being in an age group defined by user consumer;
the contributing consumer having a user consumer defined marital status;
the contributing consumer having a number of dependents within a range defined by the user consumer;
the contributing consumer having a commute within a range defined by the user consumer;
the contributing consumer having yearly mileage within a range defined by the user consumer; and
the contributing consumer being of a user consumer defined profession.

* * * * *